United States Patent
Liu et al.

(10) Patent No.: US 8,467,609 B2
(45) Date of Patent: Jun. 18, 2013

(54) DOCUMENT MANAGEMENT DEVICE AND DOCUMENT MANAGEMENT METHOD WITH IDENTIFICATION, CLASSIFICATION, SEARCH, AND SAVE FUNCTIONS

(75) Inventors: Lee-En Liu, Taipei (TW); I-Pang Lin, Changhua County (TW); Yen-Chang Chen, Taipei (TW); Shengfu Lin, Taipei (TW)

(73) Assignee: Otiga Technologies Limited, Taipei (TW)

( * ) Notice: Subject to any disclaimer, the term of this patent is extended or adjusted under 35 U.S.C. 154(b) by 868 days.

(21) Appl. No.: 12/458,860

(22) Filed: Jul. 24, 2009

(65) Prior Publication Data

US 2010/0033746 A1  Feb. 11, 2010

(30) Foreign Application Priority Data

Aug. 6, 2008  (TW) .............................. 97129953 A

(51) Int. Cl.
*G06K 9/18* (2006.01)
*G06F 7/00* (2006.01)
*G06F 17/30* (2006.01)

(52) U.S. Cl.
USPC ......................................... 382/182; 707/706

(58) Field of Classification Search
USPC .......................... 382/182; 707/705, 706, 707
See application file for complete search history.

(56) References Cited

U.S. PATENT DOCUMENTS

| | | | |
|---|---|---|---|
| 7,860,853 B2 * | 12/2010 | Ren et al. ...................... 707/706 |
| 2002/0048042 A1 * | 4/2002 | Iwase et al. .................. 358/1.15 |
| 2003/0020945 A1 * | 1/2003 | Lopez et al. ................. 358/1.15 |
| 2004/0267557 A1 * | 12/2004 | Liu et al. ........................... 705/1 |
| 2005/0162686 A1 * | 7/2005 | Barrus .......................... 358/1.15 |
| 2006/0114484 A1 * | 6/2006 | Kitora .......................... 358/1.13 |
| 2010/0034460 A1 * | 2/2010 | Liu et al. ....................... 382/175 |

* cited by examiner

*Primary Examiner* — John Strege
(74) *Attorney, Agent, or Firm* — Bacon & Thomas, PLLC

(57) ABSTRACT

The present invention provides a document management device including a file receiving device for receiving a document; an optical identification device for performing optical identification on a non-textural content in the received document; a feature mark identifier for setting up a feature mark for the document; and a database for storing the document, which can be output from the database directly or through the file receiving device. The present invention also discloses a document management method. The device and method of the present invention have functions of identification, classification, search, and save.

27 Claims, 11 Drawing Sheets ated to a document management device and a document management method, and in particular is related to a document management device and a document management method with functions of identification, classification, search, and save.

BACKGROUND OF THE INVENTION

The conventional document management device, e.g. the one disclosed in TW-200500899 (equivalent to US 2004/0267557, CN 1567326), is capable of saving an electronic document transmitted from a user end to a data folder corresponding to an address specified in the electronic document. However, when searching an electronic document saved according to this method, one can only try to locate the data folder by memory and then sequentially search through the files saved in the data folder to find out a desired electronic document. This causes users a lot of troubles. The present invention uses techniques, such as an optical identification device, a feature mark identifier, etc., to automatically set up a feature mark index at the time of saving files so that, while in later use, a user only needs to key-in one or more feature mark(s) of the electronic document in order to find the electronic document promptly.

SUMMARY OF THE INVENTION

An object of the invention is to provide a document management device.

Another objective of the invention is to provide a document management device with functions of identification, classification, search, and save.

Still another objective of the invention is to provide a document management device using an optical character recognition device for identifying feature marks.

A further objective of the invention is to provide a document management device using a feature mark as a document index.

Still a further objective of the invention is to provide a document management device using an optical character recognition device to identify a feature mark and use the feature mark as a document index.

Still a further objective of the invention is to provide a document management device using a feature mark for searching a document and outputting the target document through a webpage server.

Still a further objective of the invention is to provide a document management device including a webpage server, a file receiving device, an optical character recognition device, and a database.

Still a further objective of the invention is to provide a multifunctional office device with document management functions.

Still a further objective of the invention is to provide a multifunctional office device with functions of identification, classification, search, and save.

Still a further objective of the invention is to provide a multifunctional office device with an optical character recognition device for identifying feature marks.

Still a further objective of the invention is to provide a multifunctional office device using a feature mark as a document index.

Still a further objective of the invention is to provide a multifunctional office device using an optical character recognition device for identifying a feature mark and using the feature mark as a document index.

Still a further objective of the invention is to provide a multifunctional office device using a feature mark to search a document and using a webpage server to output the target document.

Still a further objective of the invention is to provide a multifunctional office device including a webpage server, a file receiving device, an optical character recognition device, and a database.

Still a further objective of the invention is to provide a document management method with functions of identification, classification, search, and save.

Still a further objective of the invention is to provide a document management method using an optical character recognition device for identifying a feature mark.

Still a further objective of the invention is to provide a document management method using a feature mark as a document index.

Still a further objective of the invention is to provide a document management method using an optical character recognition device for identifying a feature mark and using the feature mark as a document index.

Still a further objective of the invention is to provide a document management method using a feature mark for searching a document and outputting the target document through a webpage server.

Still a further objective of the invention is to provide a document management method using a webpage server, a file receiving device, an optical character recognition device, and a database.

According to the invention, a document management device with functions of identification, classification, search, and save comprises:

a file receiving device for receiving a document;

an optical identification device for performing optical identification on a non-textural content in the document received by the file receiving device;

a feature mark identification device for setting up a feature mark for the received document; and a database for storing the received document, which can be output from the database preferably through the file receiving device;

characterized in that:

the optical identification device is capable of performing optical identification on a non-textural content of the received document to obtain an optical identification result;

the feature mark identification device is used to set up a feature mark of the document based on features of the document, in which the features of the document includes a textural content of the document and/or the optical identification result;

when storing the document in the database, source identification information received from the file receiving device and/or the feature mark of the document is classified, and the classification results are used for storing the document; and when storing the document in the database, a document index is set up by using the feature mark, and the document index is used as a basis for searching the document stored in the database when the device is required to output the document.

The above-mentioned document management device can exist independently or be used together with a Multifunctional Office Printer (hereinafter abbreviated as MFP), e.g. a scanner, facsimile and photocopy machine, preferably used together with a MFP.

The above-mentioned file receiving device can be any known file receiving device for receiving an electronic document from the above-mentioned MFP through a Bus and/or USB/RS232, or receiving an electronic document from an external web server or external physical transmission line. Of course, the file receiving device can be a similar file receiving device that is self-produced, tailor-made from a third party, or co-produced.

The above-mentioned document means a paper document and mostly means an electronic document converted by the MFP or an electronic document per se (e.g. context and/or attachment of e-mail, electronic document transmitted through a facsimile machine, electronic document created by a scanner, various electronic documents created by computer, electronic documents from external web server or external physical transmission line, etc.); or any other electronic information obtained through conversion techniques. For examples, the document is an electronic document converted from paper documents (textural information, pictures, tables, etc.) or photos by a scanner; electronic document of physical objects and sample by using a digital camera; or any electronic document of information capable of being converted into electronic format. The format of document is not limited, e.g. TXT, MS-Office, PDF, JPG, GIF, TIFF or HTML, etc.

The above-mentioned source identification information can be any information for identifying sources, e.g. document header content (for example, sender, and sender's account number), subject, source of transmission (for example, server name of external network service provider, MAC address, network address/IP address, etc.), name of file, date of transmission, format of file, abstract of content of file, etc.

The above-mentioned optical identification device can be any known optical identification device, for example optical character recognition device (e.g. FINE READER of ABBYY Co.), barcode reader (e.g. ordinary 1-D barcode reader, 2-D barcode reader). Of course, the above-mentioned optical identification device can also be any similar optical identification device that is self-tailor-made, contract-manufactured by another company, or manufactured jointly. If the optical identification device is a barcode reader, the customers need to use barcodes. This causes trouble for the customers. Thus, ordinarily, an optical character recognition device (OCR) is preferable.

If the received document contains only a textural content, the textural content is the feature mark of the file.

If the received document contains no textural content, the optical identification result from the optical identification device is the feature mark of the document.

If the received document contains both a textural content and a non-textural content, the feature mark of the document can be the optical identification result from the optical identification device, the textural content, or both. In general, when the optical identification device is an OCR, generally the textural content plus the optical identification result is used as the feature of the document. When the optical identification device is a bar code reader, generally the optical identification result is used as the feature of the document.

The above-mentioned feature mark identification device can be any known feature mark identification device, for example, Cyclone search engine from eLAND Technologies Co. Of course, the above-mentioned feature mark identification device can also be a feature mark identification device that is self-tailor-made, contract-manufactured by another company, or manufactured jointly.

The above-mentioned feature mark identification device performs analysis, such as segmentation of phrase, segmentation of sentence, retrieval of keyword and/or analysis of contents of the document in order to set up a feature mark for the document. In general, other than the above-mentioned functions, the feature mark identification device preferably includes additional functions, such as learning of new phrases, analysis on wording/phrasing/properties of phrases/artistic conception etc.

Under special conditions, e.g. the feature mark is not available after identification by the feature mark identification device, the device can prompt the user for entering a feature mark, or automatically annotate the feature mark with, for example, "other category," whenever necessary. Furthermore, the special condition can activate subsequent programs, such as learning of new phrases, analysis of artistic conception, statistic analysis and data mining, if necessary.

When the above-mentioned database is storing the received document, the source identification information (e.g. header content) read from the file receiving device can be used for classification and the classification data are stored. For example, the type of classification (data folder) includes:

<A001 Company>   (external document source 1)
<A002 Company>   (external document source 2)
..............................................
<B001 Department>   (internal document source 1)
<B002 Department>   (internal document source 2)
..............................................

wherein A001 Company, A002 Company, etc. can be company name, company code, company homepage name, company telephone number, etc. and/or combinations thereof. The above-mentioned document is received from a fax machine or an external network service device through the file receiving device. Therefore, the document is classified as an external document; B001 Department, B002 Department, etc. can be department name, department code, department homepage name, department telephone extension, etc. and/or combinations thereof. The above-mentioned document is received from an internal bus and/or transmission hardware and through the file receiving device. Therefore, the document is classified as an internal document.

When the above-mentioned database is storing the received document, the source identification information (e.g. header content) read from the file receiving device can be used for classification and further classification, and the classification data are stored. For example, the type of classification (data folder) includes:

<A001 Company>   (External document source 1)
    <A001 Company-001>
    <A001 Company-002>
    <A001 Company-003>
        ....................
<A002 Company>   (External document source 2)
    <A002 Company-001>
    <A002 Company-002>
    <A002 Company-003>
        ....................
..............................................
<B001 Department>   (Internal document source 1)
    <B001 Department-001>
    <B001 Department-002>

-continued

```
        <B001 Department-003>
        ........................
    <B002 Department>  (Internal document source 2)
        <B002 Department-001>
        <B002 Department-002>
        <B002 Department-003>
        ........................
    .................................................
``` wherein A001 Company, A002 Company, etc. can be company name, company code, company homepage name, company telephone number, and/or combinations thereof. A001 Company-001, A001 Company-002, A001 Company-003, etc. separately are A001 Company's Department name or Department code, user's name (when the header information is an e-mail address), or a type of classification defined by the company; A002 Company-001, A002 Company-002, A002 Company-003, etc. separately are A002 Company's Department name or Department code, user's name (when the header information is an e-mail address), or a type of classification defined by the company; therefore, the classification can be more than two layers.

B001 Department, B002 Department, etc. can be department name, department code, department homepage name, department's telephone extension, and/or combinations thereof. B001 Department-001, B001 Department-002, B001 Department-003, etc. separately are B001 Department's sub-unit name or sub-unit code, user's name (when the header information is an e-mail address), or a type of classification defined by the department; B002 Department-001, B002 Department-002, B002 Department-003, etc. separately are B002 Department's sub-unit name or sub-unit code, user's name (when the header information is an e-mail address), or a type of classification defined by the department; therefore, the classification can be more than two layers.

When necessary, the above-mentioned classification can also include the above-mentioned features or feature mark as one of the basis of classification, however, preferably not including the above-mentioned information as the basis of classification.

When the above-mentioned database stores a document, the source identification information (e.g. header) read by the file receiving device, features, feature mark, date and time of storage, and/or serial number can be used as a part of the file name, for example, storing the file of A001 Company as:

```
    <A001 Company>  (External document source 1)
    BX001-a1 explanation.doc   (filename 1)
    BX002-a1 specification.xls (filename 2)
    BX003-a2 content.doc       (filename 3)
    BX004-a3 introduction.pdf  (filename 4)
    ...........................................
``` in which BX001, BX002, BX003, BX004 are serial numbers; the main filename of "a1 explanation.doc", "a2 content.doc", a3 introduction.pdf" is automatically specified by the device according to a portion of the features; and the sub-filenames are automatically specified separately according to the formats of file.

If all main filenames contain serial numbers, the files in each classification (including sub-classification) will be unique. However, when the file name contains no serial number, under special conditions, the automatically generated file name of the new document might be the same as an existing file name stored in the same classification (containing sub-classification). If this occurs, the device can request a user to prompt for new file name or automatically add the feature mark with an identification code, e.g. date (and/or time). Under special conditions, e.g. file name being not specific (for example, the main file name containing a null symbol or a restricted symbol in the database), the device can request a user to prompt for a new file name or automatically add the feature mark with an identification code, e.g. date (and/or time).

The above-mentioned feature mark can be a collection of one or more feature words and/or feature phrases. When setting up an index, each feature word or feature phrase is separately used to set up the document's essential index; however, a combination of plural feature words and/or feature phrases can also be used to further set up the document's index. However, normally when searching, the "and" function is able to replace the later indexing. For example, after identification by an optical identification device, File 1 is identified with features of: " . . . XX1 . . . XX2 . . . XX3X X4 . . . ", and with feature phrases of: XX1, XX2, XX3, XX4, XX3XX4 . . . etc. through the feature mark identification device, in which the feature phrase XX3XX4 is a composite feature phrase of feature phrase XX3 and feature phrase XX4, where the device automatically sets the file name as "YYY". And after identification by the optical identification device, File 2 has features of: " . . . XX1 . . . XX3 . . . XX4 . . . XX5 . . . ", and a feature phrase of XX1, XX3, XX4, XX5 . . . etc. through the feature mark identification device, where the device automatically sets the file name as "ZZZ". And the device automatically generates an index of feature phrases as follows:

```
                XX1......YYY
                XX1......ZZZ
                XX2......YYY
                XX3......YYY
                XX3......ZZZ
                XX3XX4......YYY
                XX4......YYY
                XX5......ZZZ
```

When a user wants to browse or output the stored documents, the user's name (or code, telephone number, telephone extension number, etc.) together with a password (e.g. text code, bar code, fingerprint, iris, etc.) if necessary, will be requested to search for a to-be-browsed or outputted document. The method of search can be any known search method, for example full text search, keyword (feature word, feature phrase) search, classification search, date and/or time search, or date interval search, etc. A feature phrase search, for example, is used in the above-mentioned files:

On a later date, when the user wants to search for files containing XX1, the file YYY and file ZZZ (of course, other files containing XX1) can be located;

On a later date, when the user wants to search for files containing XX2, the file YYY can be located, but not the file ZZZ;

On a later date, when the user wants to search for files containing XX3 and XX4, the file YYY and file ZZZ can be located;

On a later date, when the user wants to search for files containing XX3XX4, only file YYY can be located, but not file ZZZ.

The above-mentioned document management device can be used together with a multifunctional printer (MFP), as mentioned previously. However, generally speaking, the document management device can also be integrated with a MFP to form a multifunctional office machine with document management functions, as described in the following.

The present invention also provides a multifunctional office device with document management function, which includes:

a MFP component;

a file receiving device for receiving a document from said MFP component;

an optical identification device for performing optical identification on a non-textural content in the document received by the file receiving device;

a feature mark identification device for setting up a feature mark for the received document; and a database for storing the received document, which can be output from the database preferably through the file receiving device or said MFP component;

characterized in that:

the optical identification device is capable of performing optical identification on a non-textural content of the received document to obtain an optical identification result;

the feature mark identification device is used to set up a feature mark of the document based on features of the document, in which the features of the document includes a textural content of the document and/or the optical identification result;

when storing the document in the database, source identification information received from the file receiving device and/or the feature mark of the document is classified, and the classification results are used for storing the document; and when storing the document in the database, a document index is set up by using the feature mark, and the document index is used as a basis for searching the document stored in the database when the device is required to output the document.

The above-mentioned electronic document, source identification information, classification, identification of feature mark, storing, indexing, and outputting electronic document involved in the multifunctional office device are similar to those described above in relation to the document management device of the present invention, as well as the file receiving device, optical identification device, and database.

The above-mentioned MFP component can be any known device with document input and/or output functions (e.g. conventional printer, scanner, fax machine, photocopy machine) or similar device, which is physically connected to the above-mentioned file receiving device, optical identification device, and database to form a complete a multifunctional office device with document management function of the present invention. The conventional device with document input and/or output functions may be modified or adjusted prior to being used as the MFP component. Alternatively; a self-designed component having mechanisms of, for example, printing, scanning, facsimile, and photocopy, can be used as the MFP component.

The present invention also discloses a document management method, which comprises:

a document receiving step for receiving a to-be-stored electronic document;

a document dissecting step for dissecting a source identification information of the electronic document;

a classification step for classifying the electronic document based on the source identification information; and a file storage step for storing the electronic document according to the classification;

which is characterized in further comprising:

a feature mark identification step for setting up a feature mark of the document based on features of the document; and an index setting up step for setting up an index by using the feature mark, wherein the index is used as a basis for searching the stored document when the document is required to output.

The above-mentioned electronic document, source identification information, classification, identification of feature mark, indexing, and outputting electronic document involved in the method of the present invention are similar to those described above in relation to the document management device of the present invention. Procedures for implementing the invented method will be described in the following preferred embodiments or examples.

In the method of the present invention, if the classification adopts a coarse classification using the source identification information, and then a fine classification using the feature mark, the relationship between the classification step and the feature mark identification step can be: using the source identification information to perform coarse classification and then, after performing the feature mark identification step, using the feature mark to perform fine classification; alternatively, performing the feature mark identification step and then performing the classification step (including coarse classification and fine classification).

In the method of the present invention, if the classification is done only using the source identification information without using the feature mark to perform fine classification, the relationship between the classification step and the feature mark identification step can be: performing the classification step and then the feature mark identification step. Under such a condition, the sequence of the classification step and the feature mark identification step can be reversed, or performed simultaneously or alternately.

DETAILED DESCRIPTION OF PREFERRED EMBODIMENTS

To better understand the present invention, a number of preferred embodiments, together with drawings, will be elaborated in the following.

Figure 1A:
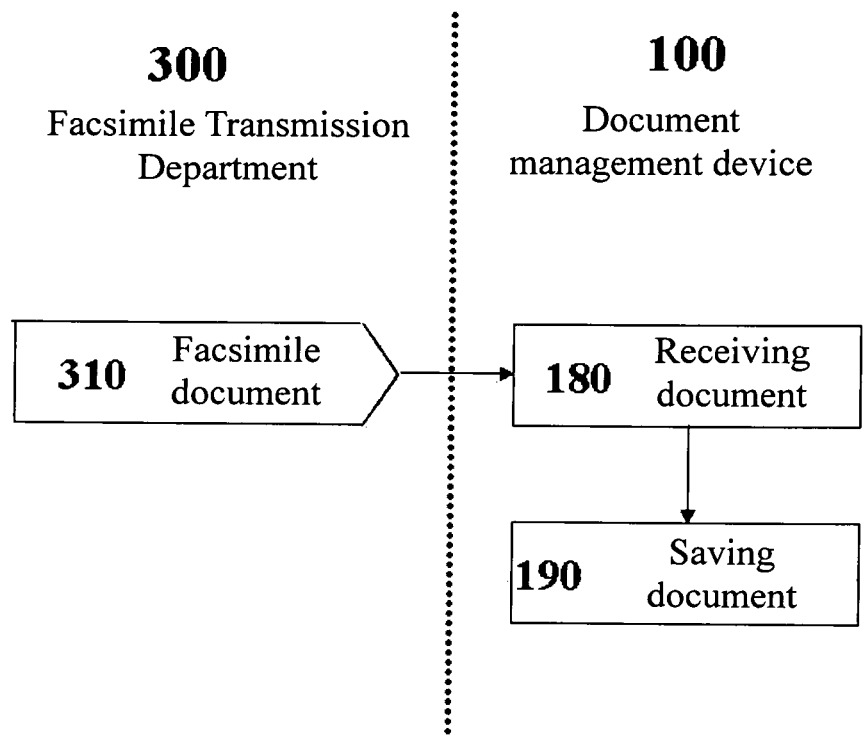
FIG. 1a is a schematic block diagram showing the receiving/saving document mechanism according to the present invention when a user receives a document via a facsimile machine.

In FIG. 1*a*, when the outside (Facsimile transmission department 300) sends a facsimile document 310 to a MFP with document management device 100, the document management device 100 will perform a document receiving task 180, followed by a document saving task 190.

Figure 1B:
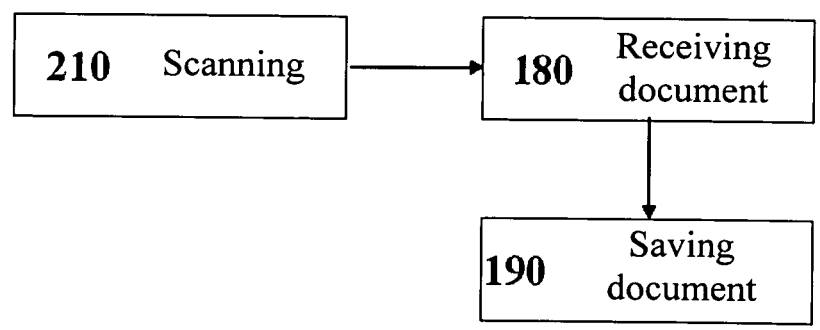
FIG. 1b is a schematic block diagram showing the receiving/saving document mechanism according to the present invention when a user receives a document via a scanner.

In FIG. 1*b*, when the internal uses a MFP 200 with document management device 100 to save a document, firstly the MFP 200 is used to perform a document scanning step 210 for scanning the document, and transmitting the scanned document to the document management device 100. The document management device 100 perform a document receiving task 180, followed by a document saving task 190.

Figure 1C:
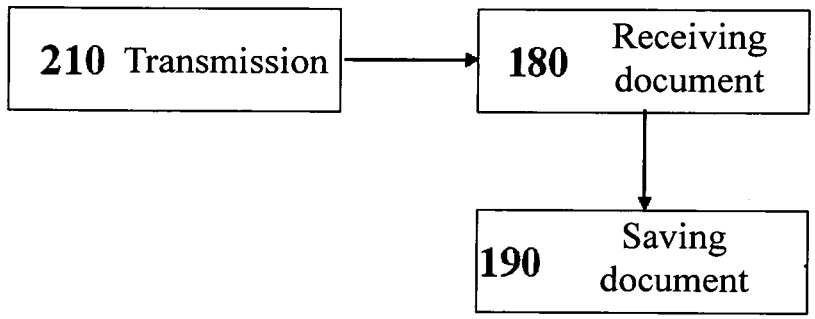
FIG. 1c is a schematic block diagram showing the receiving/saving document mechanism according to the present invention when a user transmits a document via a computer.

In FIG. 1*c*, when the internal uses a computer 205 to save a document, firstly a document transmission step 210 is performed to sent the document to the document management device 100. The document management device 100 perform a document receiving task 180, followed by a document saving task 190.

Figure 2:
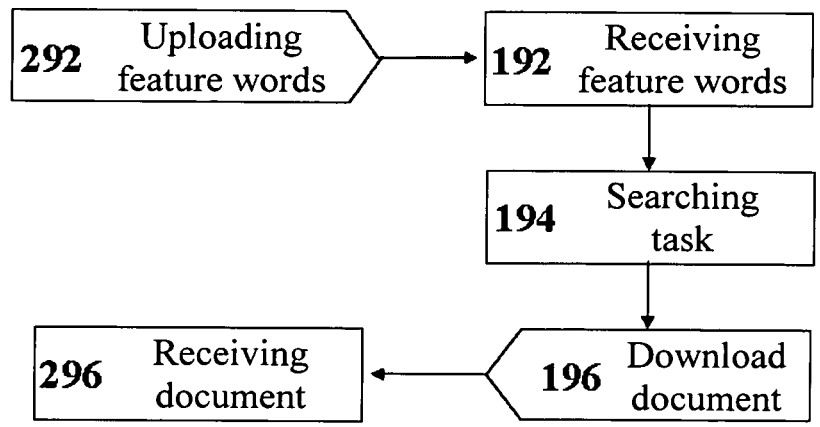
FIG. 2 is a schematic block diagram showing a mechanism for a user searching a document by using a computer and the document management device of the present invention.

In FIG. 2, when a user wants to search an existing electronic document, a computer 205 is used to perform uploading a feature word 292, and one or more feature words are uploaded to the document management device 100. The document management device will perform a step for receiving the uploaded information 192, a search task 194, and then a step of document downloading 196, so that the searched result (a document meeting the search conditions, or "null" message) is downloaded to the computer 205. The user performs a step of receiving the downloaded document 296 in order to obtain the search result.

Figure 3A:
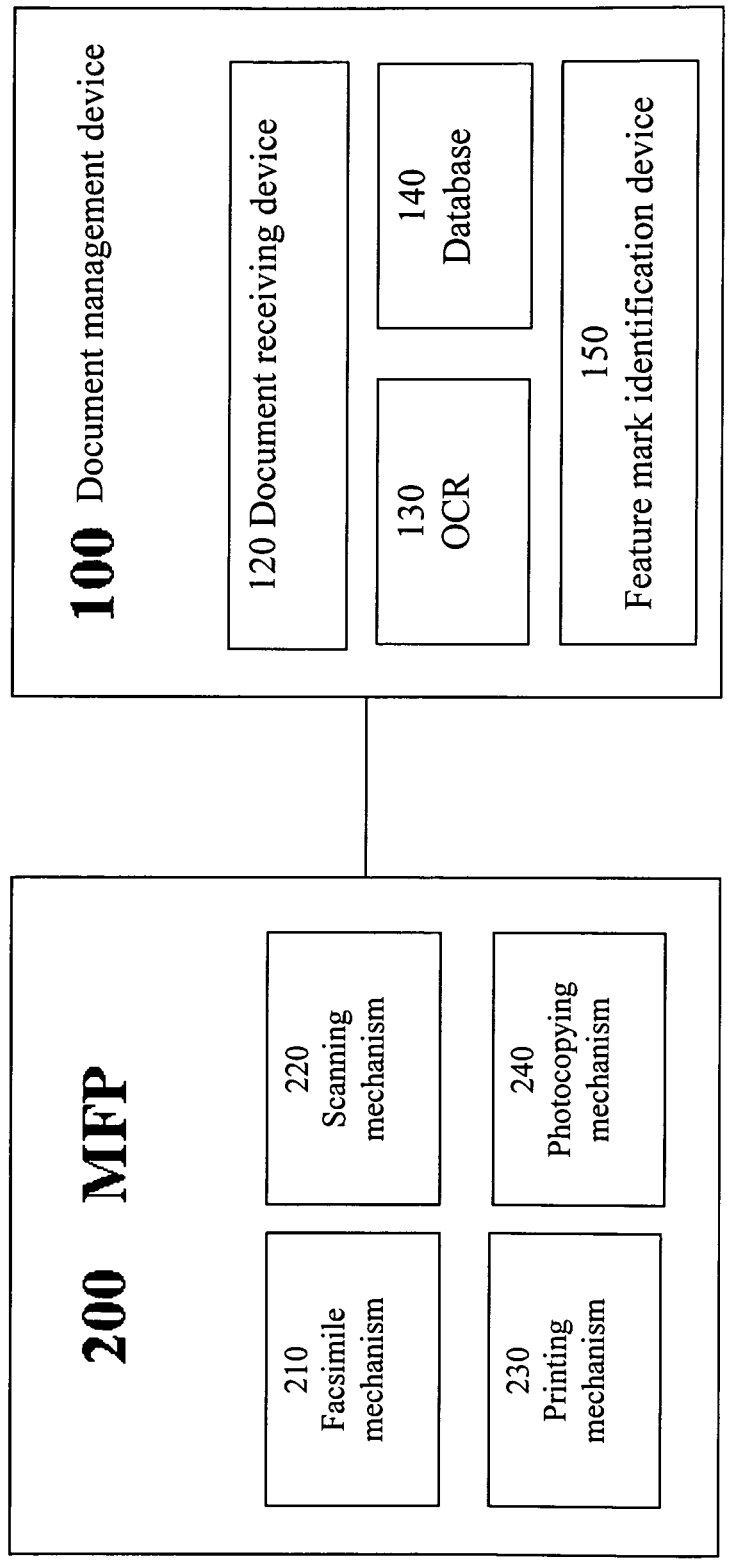
FIG. 3a is a block diagram showing the document management device of the present invention connected to a MFP.

FIG. 3*a* shows a schematic structure of a document management device 100 connected to a MFP 200 according to the invention, wherein the document management device 100 contains a file receiving device 120, an optical identification device (OCR) 130, a database 140 and a feature mark identification device 150. The MFP 200 contains a facsimile mechanism 210, scanning mechanism 220, printing mechanism 230, and photocopying mechanism 240. The document management device 100 and the MFP 200 are connected with a transmission component, indicated by a line segment in the figure. The operations of the device are the same as described above.

Figure 3B:
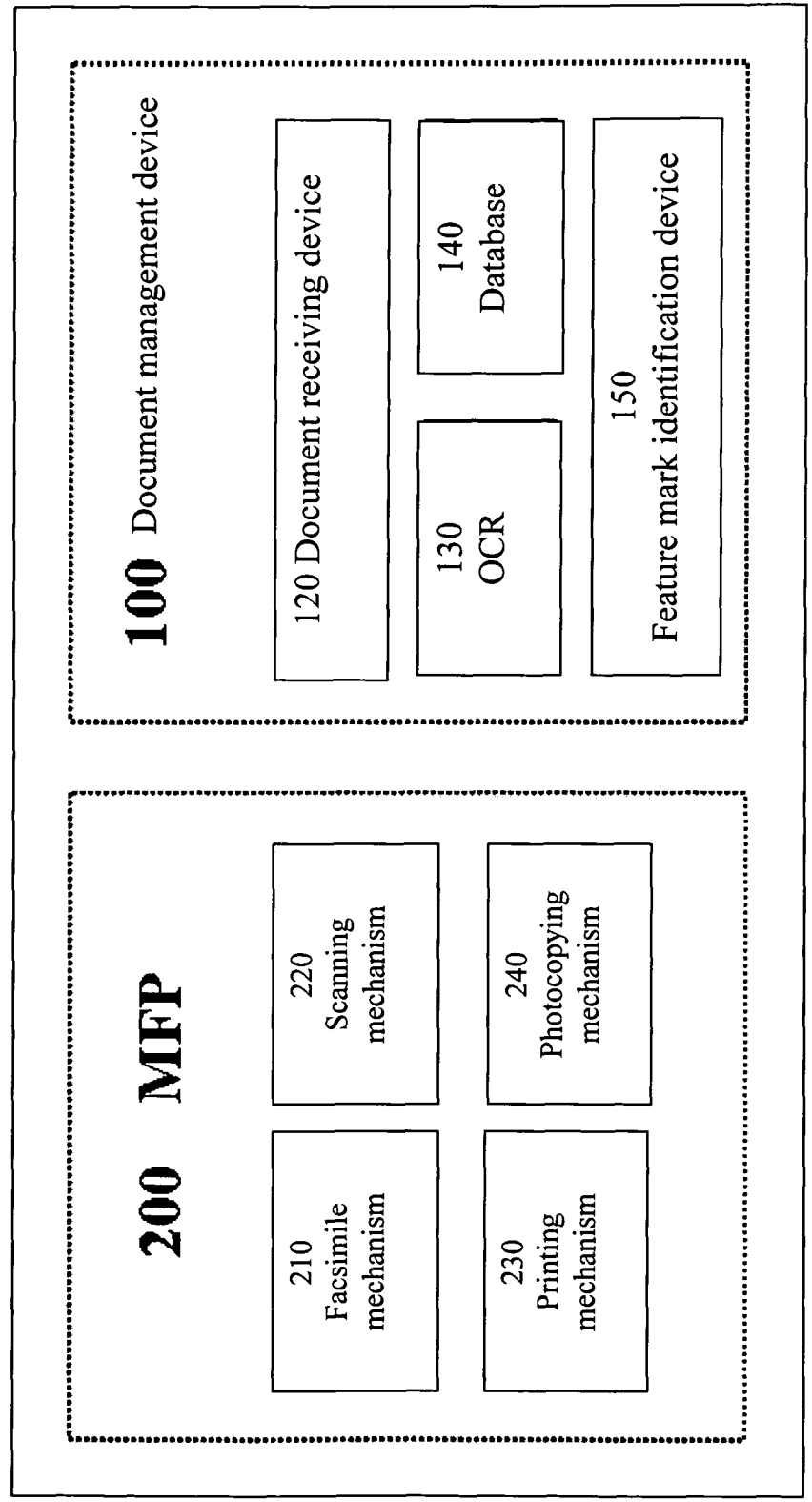
FIG. 3b is a block diagram showing the document management device of the present invention combined with a MFP.

FIG. 3*b* shows a schematic structure of a document management device 100 integrated with a MFP 200 according to the invention, wherein the document management device 100 contains a file receiving device 120, an optical identification device (OCR) 130, a database 140 and a feature mark identification device 150. The MFP 200 contains a facsimile mechanism 210, scanning mechanism 220, printing mechanism 230, and photocopying mechanism 240. The document management device 100 and the MFP 200 are combined into an integral assembly, shown with an external frame in the diagram. This diagram can also be viewed as a structural block diagram of a multifunctional printer device with document management function. The operations of the device are the same as described above.

Figure 3C:
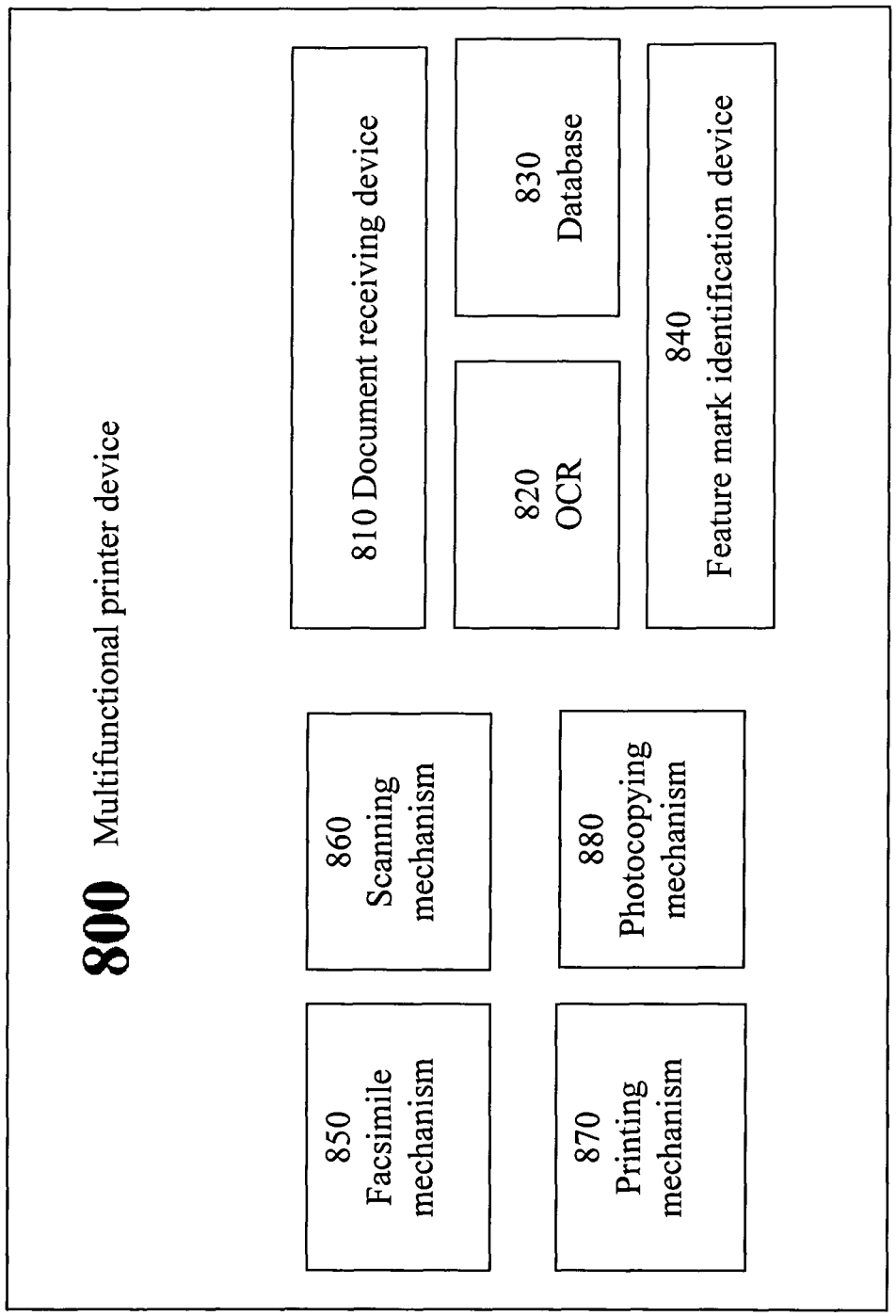
FIG. 3c is a block diagram showing a multifunctional printer device having a document management function according to the present invention.

FIG. 3*c* shows a schematic structure of a multifunctional printer device with document management function 800 according to the invention, which contains a file receiving device 810, an optical identification device (OCR) 820, a database 830, a feature mark identification device 840, a facsimile mechanism 850, a scanning mechanism 860, a printing mechanism 870, and a photocopying mechanism 880. The operations of the device are the same as described above.

Figure 4:
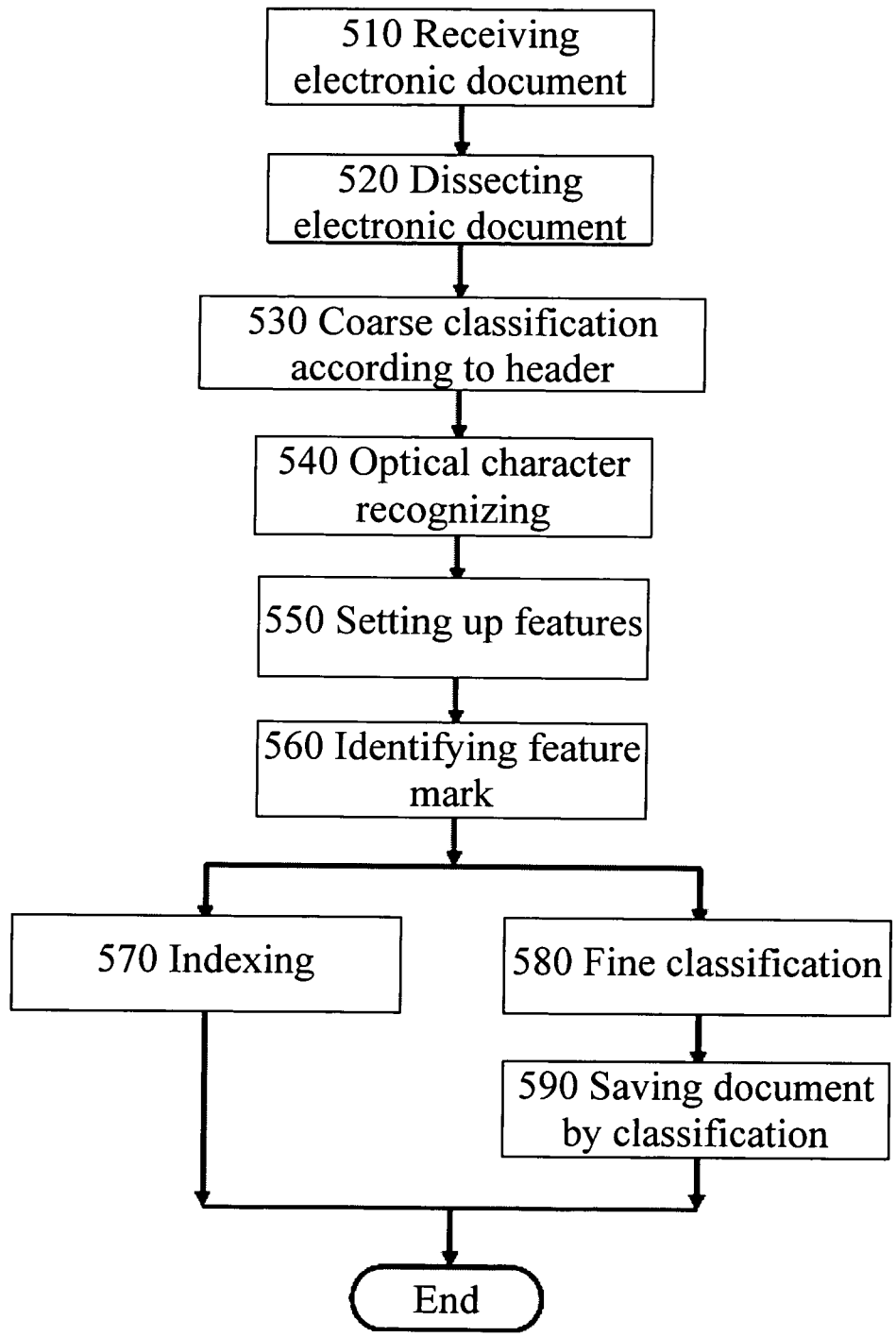
FIG. 4 shows a preferred schematic flowchart of executing a save task by using the document management device according to the present invention.

As shown in FIG. 4, when the document management device has received the electronic document (receiving electronic document 510), a step 520 of dissecting the electronic document will be performed immediately in order to dissect the header content of the electronic document; a coarse classification step 530 is then performed on the information dissected from the header content. An optical character recognizing step 540 is performed on the non-textural content in the electronic document, followed by a step of setting up features 550 according to the OCR recognizing results and the text content of the electronic document. Subsequently, the Cyclone Search Engine is used to identify a feature mark 560 from the features. The feature mark is used to set up an index 570 for using as a basis for searching the document, while a fine classification 580 is preformed on the feature mark. The classification results (coarse classification plus fine classification) are used as a base for storing the electronic document by performing a file storage step 590.

Figure 5:
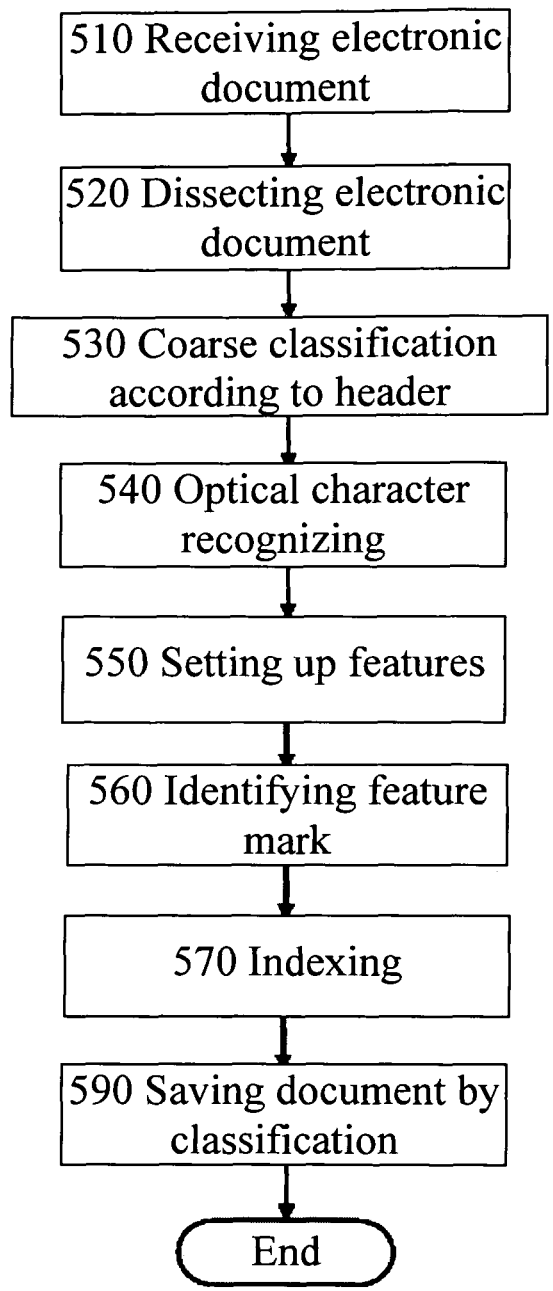
FIG. 5 shows another preferred schematic flowchart of executing a save task by using the document management device according to the present invention.

As shown in FIG. 5, when the document management device has received the electronic document (receiving electronic document 510), a step 520 of dissecting the electronic document will be performed immediately in order to dissect the header content of the electronic document; a classification step 530 is then performed on the information dissected from the header content. An optical character recognizing step 540 is performed on the non-textural content in the electronic document, followed by a step of setting up features 550 according to the OCR recognizing results and the text content of the electronic document. Subsequently, identifying a feature mark 560 from the features is performed. The feature mark is used to set up an index 570 for using as a basis for searching and outputting the document. The classification results from the header content are used as a base for storing the electronic document by performing a file storage step 590.

Figure 6:
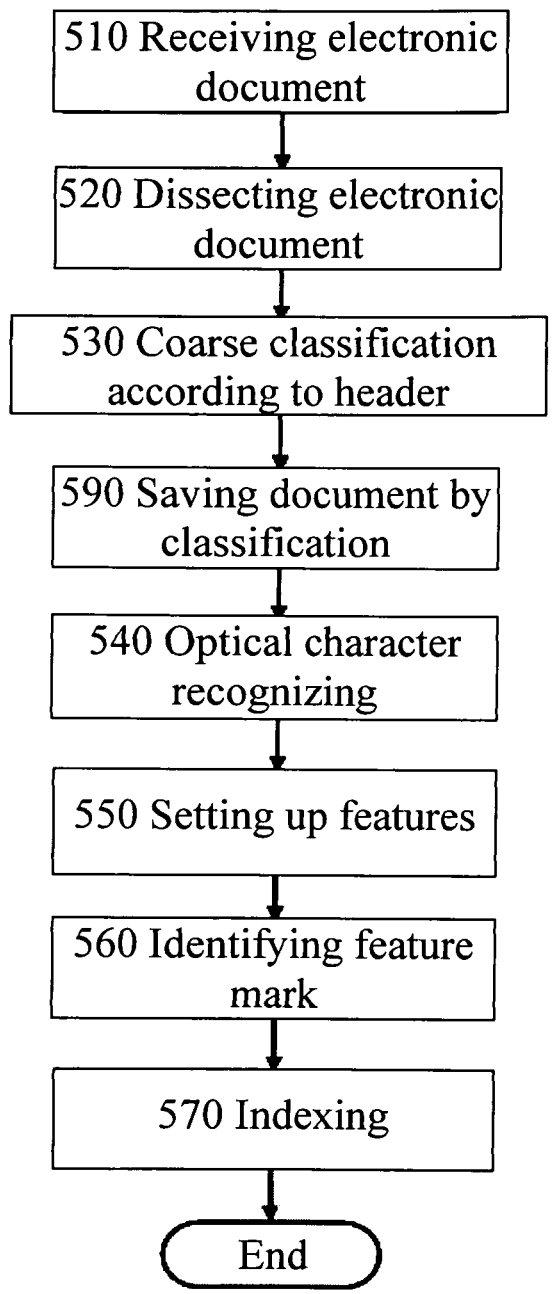
FIG. 6 shows another preferred schematic flowchart of executing a save task by using the document management device according to the present invention.

As shown in FIG. 6, when the document management device has received the electronic document (receiving electronic document 510), a step 520 of dissecting the electronic document will be performed immediately in order to dissect the header content of the electronic document; a classification step 530 is then performed on the information dissected from the header content. The classification results are used as a basis for storing the electronic document by performing a file storage step 590. An optical character recognizing step 540 is performed on the non-textural content in the electronic document, followed by a step of setting up features 550 according to the OCR recognizing results and the text content of the electronic document. Subsequently, identifying a feature mark 560 from the features is performed. The feature mark is used to set up an index 570 for using as a basis for searching and outputting the document.

Figure 7:
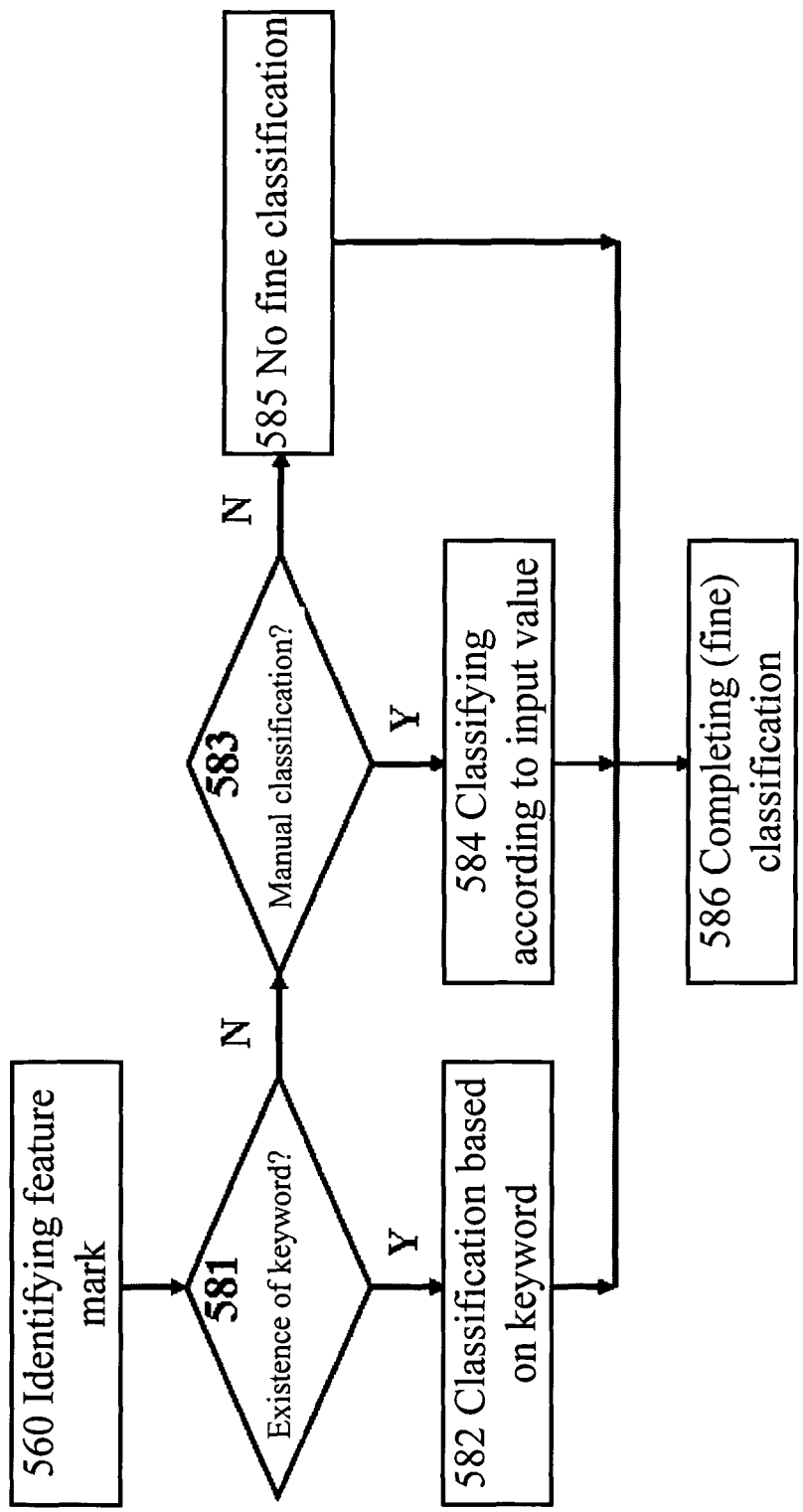
FIG. 7 shows a preferred schematic flowchart of executing fine classification according to the present invention.

FIG. 7 is a flowchart showing detailed steps of the step of fine classification 580 in FIG. 4, which is next to the step of identifying the feature mark 560, and involves searching a key word in the feature mark. As shown in FIG. 7, a step 581 is performed to determine the existence of key word; if a key word exists, the key word is used to further perform a classification 582 based on the key word, and then a (fine) classification 586 is completed; if no key word exists, a user will have to decide whether to perform a manual classification 583. A classification 584 is performed according to an input value, if the user decide to perform the manual classification, and the input content is used to complete the (fine) classification; if no, a step of no fine classification 585 is performed, and the (fine) classification 586 is completed.

Figure 8:
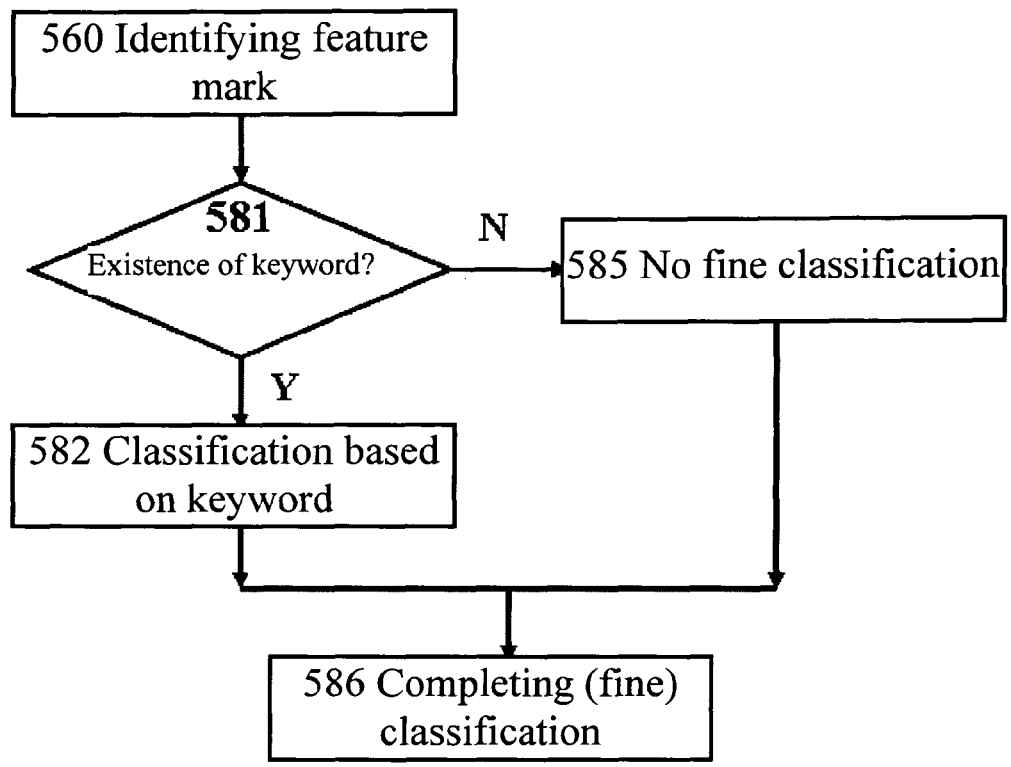
FIG. 8 shows another preferred schematic flowchart of executing fine classification according to the present invention.

FIG. 8 is a flowchart showing another way for carrying out the step of fine classification 580 in FIG. 4, which is next to the step of identifying the feature mark 560, and involves searching a key word in the feature mark. As shown in FIG. 8, a step 581 is performed to determine the existence of key word; if a key word exists, the key word is used to further perform a classification 582 based on the key word, and then a (fine) classification 586 is completed; if no key word exists, a step of no fine classification 585 is performed, and the (fine) classification 586 is completed.

Figure 9:
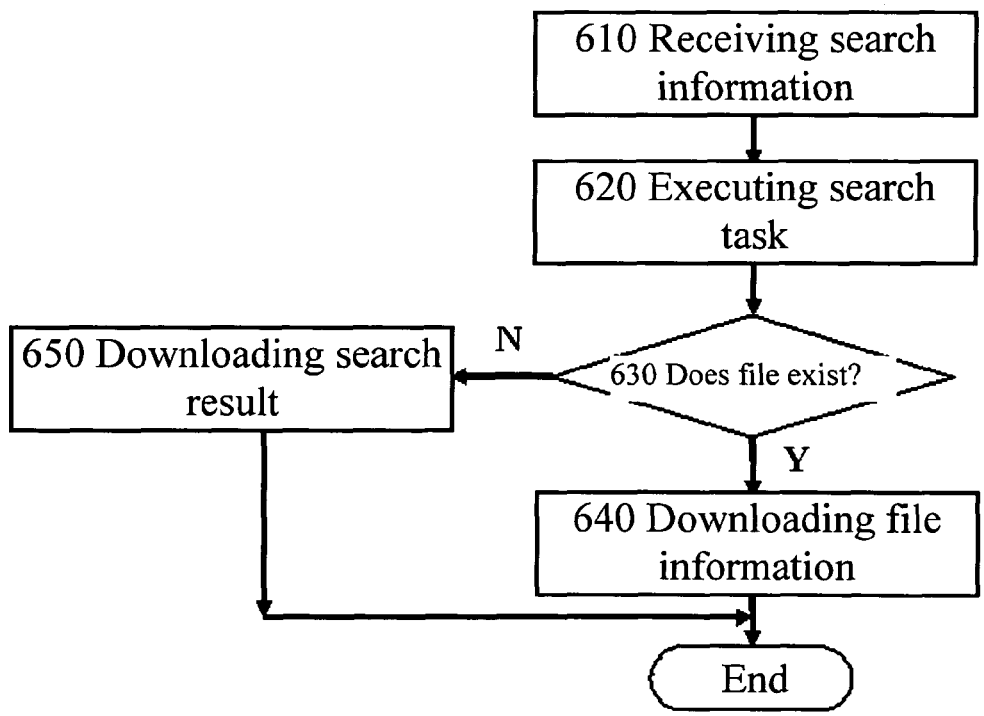
FIG. 9 shows a preferred flowchart of executing a search task according to the present invention.

As shown in FIG. 9, a step of receiving search information 610 triggers the device performing a step of search task 620 to perform searching according to the search conditions, followed by a step of determining the existence of a file 630 or not in order to determine whether there is a file which meets the search information. If the answer is affirmative, the device will perform a step of downloading file information 640 in order to download the target file to the user; if the answer is negative, the device will perform a step of downloading a search result 650 in order to transmit a message of "no file meeting search conditions" to the user.

Figure 10:
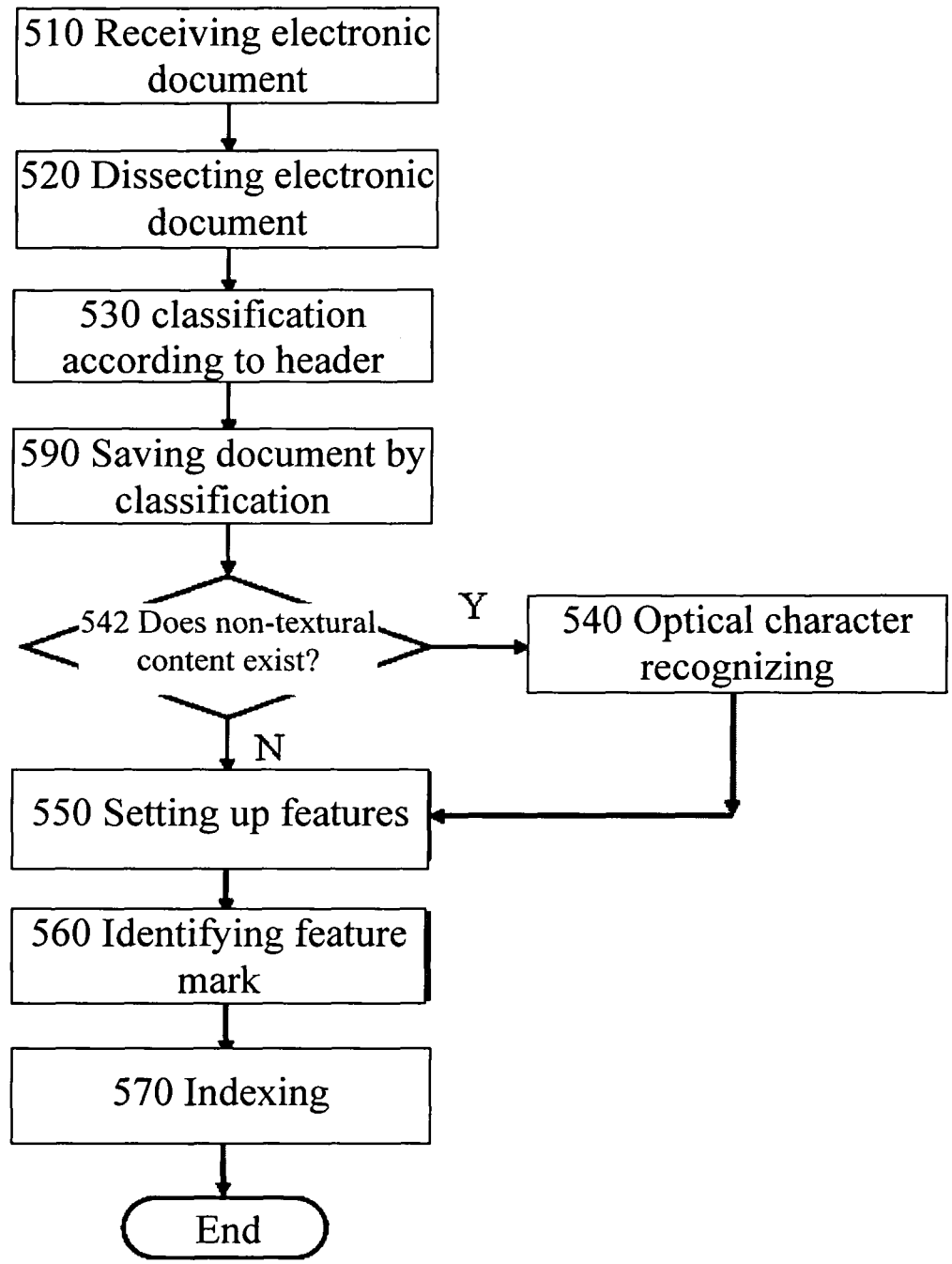
FIG. 10 is a schematic flowchart showing a preferred embodiment of the document management method according to the invention.

FIG. 10 shows a flowchart of a preferred embodiment according to the invention. As shown in FIG. 10, when the document management device has received the electronic document (receiving electronic document 510), a step 520 of dissecting the electronic document will be performed immediately in order to dissect the header content of the electronic document; a classification step 530 is then performed on the information dissected from the header content. The classification results are used as a basis for storing the electronic document by performing a file storage step 590. Next, a step of determining the existence of non-textual content 542 is performed to determine the existence or not of "non-textual content" in the document. If the answer is affirmative, an optical character recognizing step 540 is performed on the non-textual content in the electronic document, followed by a step of setting up features 550 according to the OCR recognizing results and the text content of the electronic document. If the answer is negative, the step of setting up features 550 according to the text content of the electronic document is performed. Subsequently, identifying a feature mark 560 from the features is performed. The feature mark is used to set up an index 570 for using as a basis for searching and outputting the document.

Furthermore, taking the specification of this invention as an example, the step of optical character identification 540, the step of setting up features 550, the step of identifying feature mark 560, and the step of setting up index 570, will be described in the following, as well as the search of the document.

The contents of the present invention include: Title of the Invention, Field of the Invention, Background of the Invention, Summary of the Invention, . . . , Claims, Abstract, and Drawings, wherein the Title of the Invention, Background of the Invention, Summary of the Invention, . . . , Claims, and Abstract are textual content, and the Drawings are non-textual content. Therefore, in the step of optical character recognizing 540, the OCR device performs an optical character recognition task on the drawings. Taking FIG. 1*a* as an example, after OCR, the textual content of "300 Facsimile transmission department", "310 Facsimile document", "100 Document management device", "180 Receiving document", and "190 Saving document" are obtained.

In the step of setting up features 550, the textural content obtained in the optical character recognizing 540 step is combined with the original textural content (Title of the Invention, Field of the Invention, Background of the Invention, Summary of the Invention, . . . , Claims, Abstract) to form features.

In the step of identifying the feature mark 560, the feature mark identification device performs a feature mark identification task on the features set up in the setting up step 550. Taking the Title of the Invention as an example to perform the feature mark identification, the feature words of "identification, classification, search, save, document, management, device" are obtained. Taking the text in FIG. 1*a* obtained by OCR as an example to perform the feature mark identification, the feature words of "facsimile, transmission, department, document, management, device, receiving, and saving" are obtained.

In the step 570 of setting up an index, the device uses the feature words obtained in the feature mark identification step 560 to execute an indexing program on a to-be-stored document (flowcharts shown in FIG. 4 or FIG. 5) or a stored document. If the device automatically set the file name as "Document management device with identification, classification, search, and save functions" (hereinafter abbreviated as Document management device), taking an example of using the feature words contained in the Title of the Invention, the device will automatically generate an index table of feature words, as shown in Table 1.

TABLE 1

Index table set up by the feature words in the Title of the Invention

| | |
|---|---|
| Identification | Document management device |
| Identification, classification | Document management device |
| Identification, classification, search | Document management device |
| Identification, classification, search, save | Document management device |
| Identification, classification, search, save functions | Document management device |
| Classification | Document management device |
| Classification, search | Document management device |
| Classification, search, save | Document management device |
| Classification, search, save function | Document management device |
| Search | Document management device |
| Search, save | Document management device |
| Search, save function | Document management device |
| Save | Document management device |
| Save function | Document management device |
| Document | Document management device |
| Document management | Document management device |
| Document management device | Document management device |
| Management | Document management device |
| Management device | Document management device |
| Device | Document management device |

Taking the feature words contained in FIG. 1*a* as an example, the device will automatically generate an additional index table of feature words, as shown in Table 2.

TABLE 2

Index table built using the feature words in FIG. 1a

| Facsimile | Document management device |
|---|---|
| Facsimile transmission | Document management device |
| Facsimile transmission department | Document management device |
| Transmission | Document management device |
| Transmission department | Document management device |
| Department | Document management device |
| Facsimile document | Document management device |
| Receiving | Document management device |
| Receiving document | Document management device |
| Saving | Document management device |
| Saving document | Document management device |

The index in Table 2 does not contain feature words of "document", "document management", "document management device", "management" "management device" and "device", as the above-mentioned feature words have been shown in Table 1.

After saving the document and setting up the index tables, the device's user can use the feature word to search/display/download the document. For example, the user uses "save" to perform search of feature words. The document management device 100 receives the search information in the step 610 of receiving search information, and immediately executes the search task step 620 to check for whether the index tables containing the feature word "save" (determining existence of file step 630). The search results show that the index table 1 contains the feature word "save". Therefore, the step 640 of downloading file information is executed subsequently, i.e. the document management device will download this file to the user end. After receiving the information, the user can decide on his/her own to display and/or download the file.

The invention claimed is:

1. A document management device with identification, classification, search and save functions, which comprises:
    a file receiving device for receiving a document;
    an optical identification device for performing optical identification on a non-textural content in the document received by the file receiving device;
    a feature mark identification device for setting up a feature mark for the received document; and
    a database for storing the received document, which can be output from the database directly or through the file receiving device;
    wherein:
    the optical identification device is capable of performing optical identification on a non-textural content of the received document to obtain an optical identification result;
    the feature mark identification device is used to set up a feature mark of the document based on features of the document, in which the features of the document includes one of:
        a textural content of the document obtained through analysis by the feature mark identification device,
        the optical identification result obtained by optical identification on the non-textural content of the document, and
        a combination of the textural content of the document and the non-textural content;
    when the textural content of the document and the optical identification results are not available, the feature mark identification device sets up the feature mark by prompting a user to enter the features of the document;
    when storing the document in the database, source identification information received from the file receiving device or the feature mark of the document is classified, and the classification results are used for storing the document; and
    when storing the document in the database, a document index is set up by using the feature mark, and the document index is used as a basis for searching the document stored in the database when the device is required to output the document.

2. The document management device as claimed in claim 1, wherein the optical identification device is an optical character recognition (OCR) device.

3. The document management device as claimed in claim 1, wherein the source identification information received from the file receiving device is used for classification, and the classification results are used for storing the document.

4. The document management device as claimed in claim 1, wherein the source identification information is a document header content.

5. The document management device as claimed in claim 1, wherein the document is an electronic document.

6. The document management device as claimed in claim 5, wherein the document is an electronic document selected from the group consisting of e-mail including main text or attachment, an electronic document transmitted by facsimile, an electronic documents created by a scanner, and electronic documents created by a computer.

7. The document management device as claimed in claim 1, wherein the feature mark identification device further comprises functions of learning new phrases, and analysis on wording, phrasing and properties of phrases, and artistic conception.

8. The document management device as claimed in claim 1, wherein the feature mark identification device further comprises a data mining function.

9. The document management device as claimed in claim 1, wherein the file receiving device is Http, FTP, IMAP, SMTP or a combination thereof.

10. The document management device as claimed in claim 9, wherein the file receiving device is FTP, IMAP, SMTP or a combination thereof.

11. A multifunctional office device with a document management function, which comprises:
    a MFP component;
    a file receiving device for receiving a document from said MFP component;
    an optical identification device for performing optical identification on a non-textural content in the document received by the file receiving device;
    a feature mark identification device for setting up a feature mark for the received document; and
    a database for storing the received document, which can be output from the database preferably through the file receiving device or said MFP component;
    wherein:
    the optical identification device is capable of performing optical identification on a non-textural content of the received document to obtain an optical identification result;
    the feature mark identification device is used to set up a feature mark of the document based on features of the document, in which the features of the document includes one of:
        a textural content of the document obtained through analysis by the feature mark identification device,
        the optical identification result obtained by optical identification on the non-textural content of the document, and a combination of the textual content of the document and the non-textural content;

when the textual content of the document and the optical identification results are not available, the feature mark identification device sets up the feature mark by prompting a user to enter the features of the document;

when storing the document in the database, source identification information received from the file receiving device or the feature mark of the document is classified, and the classification results are used for storing the document; and when storing the document in the database, a document index is set up by using the feature mark, and the document index is used as a basis for searching the document stored in the database when the device is required to output the document.

12. The multifunctional office device as claimed in claim 11, wherein the optical identification device is an optical character recognition (OCR) device.

13. The multifunctional office device as claimed in claim 11, wherein the source identification information received from the file receiving device is used for classification, and the classification results are used for storing the document.

14. The multifunctional office device as claimed in claim 11, wherein the source identification information is a document header content.

15. The multifunctional office device as claimed in claim 11, wherein the document is an electronic document.

16. The multifunctional office device as claimed in claim 15, wherein the document is an electronic document selected from the group consisting of e-mail including main text or attachment, an electronic document transmitted by facsimile, an electronic documents created by a scanner, and electronic documents created by a computer.

17. The multifunctional office device as claimed in claim 11, wherein the feature mark identification device further comprises functions of learning new phrases, and analysis on wording, phrasing and properties of phrases, and artistic conception.

18. The multifunctional office device as claimed in claim 1, wherein the feature mark identification device further comprises a data mining function.

19. The multifunctional office device as claimed in claim 11, wherein the file receiving device is Http, FTP, IMAP, SMTP or a combination thereof.

20. The multifunctional office device as claimed in claim 19, wherein the file receiving device is FTP, IMAP, SMTP, or a combination thereof.

21. A document management method, which comprises:
a document receiving step for receiving a to-be-stored electronic document;
a document dissecting step for dissecting a source identification information of the electronic document;
a classification step for classifying the electronic document based on the source identification information; and
a file storage step for storing the electronic document according to the classification;
a feature mark identification step for setting up a feature mark of the document based on features of the document; and
an index setting up step for setting up an index by using the feature mark, wherein the index is used as a basis for searching the stored document when the document is required to output,
wherein prior to performing the feature mark identification step, the method further comprises an optical identification step for identifying a non-textural content in the electronic document, and the feature mark identification step uses the identification result of the optical identification step, a textural content of the electronic document, or both the identification result and the textural content of the electronic document, for setting up the feature mark; and the method further comprises prompting a user to enter the features of the document when the textural content of the document and the identification result are not available, and the feature mark identification step using the features entered by the user for setting up the feature mark.

22. The document management method as claimed in claim 21, wherein the optical identification step comprises using an optical character recognition (OCR) device to perform optical identification.

23. The document management method as claimed in claim 21, wherein the source identification information is a document header content.

24. The document management method as claimed in claim 21, wherein the feature mark identification step uses a feature mark identification device comprising functions of learning new phrases, and analysis wording, phrasing and properties of phrases, and artistic conception.

25. The document management method as claimed in claim 21, wherein the feature mark identification step uses a feature mark identification device comprising a data mining function.

26. The document management method as claimed in claim 21, wherein the document receiving step uses a file receiving device comprising Http, FTP, IMAP or SMTP.

27. The document management method as claimed in claim 26, wherein the file receiving device is FTP, IMAP, SMTP or a combination thereof.

* * * * *